United States Patent [19]

Lees et al.

[11] Patent Number: 5,066,307

[45] Date of Patent: Nov. 19, 1991

[54] TEXTILE FINISHING AGENTS HAVING REDUCED FORMALDEHYDE EMISSION

[75] Inventors: Robert G. Lees, Stamford, Conn.; Edward B. Lawler, Charlotte, N.C.

[73] Assignee: American Cyanamid Company, Stamford, Conn.

[21] Appl. No.: 671,188

[22] Filed: Mar. 18, 1991

Related U.S. Application Data

[63] Continuation of Ser. No. 102,459, Sep. 29, 1987, abandoned.

[51] Int. Cl.$^5$ .................. C08L 61/32; D06M 13/355; D06M 13/382
[52] U.S. Cl. ............................. 8/182; 8/183; 8/184; 8/185; 8/186; 8/187; 8/115.59; 8/115.65; 8/DIG. 21; 524/843; 525/473; 528/243; 528/266

[58] Field of Search ................... 8/182, 184, 185, 186, 8/187, 115.59, 115.65, DIG. 21; 524/843; 525/473; 528/243, 266

[56] References Cited

U.S. PATENT DOCUMENTS 3,597,380  8/1971  Bertini et al. ........................... 8/182

OTHER PUBLICATIONS

Tomasino et al., *Textile Chemist and Colorist*, vol. 16, No. 12, Dec. 1984, pp. 259–264.

*Primary Examiner*—James C. Cannon
*Attorney, Agent, or Firm*—Roger S. Benjamin

[57] ABSTRACT

Polyhydroxyalkyl melamine used in the processing of textiles with amino resins to reduce formaldehyde emissions and improve textile "hand".

43 Claims, No Drawings

TEXTILE FINISHING AGENTS HAVING REDUCED FORMALDEHYDE EMISSION

This is a continuation of co-pending application Ser. No. 07/102,459 filed on Sept. 29, 1987, and now abandoned.

BACKGROUND OF THE INVENTION

Amino resins have long been used to impart desirable characteristics to fabrics. Resin addition to textiles generally modifies the "hand" of the treated material as judged by qualities such as resiliency or firmness. Moreover, color retention and other fabric properties may be improved or protected by amino resin treatment of textiles. Generally, these improvements result from the addition of 0.5 to 10 add-on weight percent amino resin to a textile.

Amino resins are typically formed as the reaction product of amine compounds with formaldehyde. A shortcoming of these resins is that they tend to emit formaldehyde during manufacture, use, and subsequent storage. For example, a strong odor of formaldehyde may be evidenced upon opening a roll of amino resin treated fabric stored under conditions of heat and humidity.

It is, therefore, desirable to develop alternative textile finishing agents that have acceptable properties of "hand", but also minimize formaldehyde emission.

It is an object of this invention to prepare amino resin containing compositions and composition treated textiles which have improved "hand" and/or reduced potential for formaldehyde release.

FIELD OF THE INVENTION

This invention pertains to improved amino resin compositions, textile finishing compositions, resin treated textiles, and methods of making resin treated textiles.

SUMMARY OF THE INVENTION

This invention relates to an amino resin containing composition.

This invention is also an amino resin treated textile having a reduced tendency to emit formaldehyde.

This invention is also a method of treating textiles with amino resin finishing composition of the invention.

DETAILED DESCRIPTION OF THE INVENTION

The Amino Resin Composition of the Invention

The amino resin composition of this invention may be employed for any conventional purpose for which resins, and particularly amino resins, are used. Thus, the resin compositions of this invention may be used to form objects, make coatings, impregnate fabrics, and enhance properties of common materials.

The principal utility of the amino resin composition of this invention is in the addition thereof to substrates where the resulting product has a high surface to volume ratio. Thus, the improved amino resins of this invention find use in paints, protective coatings, and impregnants.

Where large surface exposure of amino resin is expected the composition of this invention shows particular advantage by virtue of its ability to reduce formaldehyde emission.

The fabric finishing compositions of this invention has as its resin forming materials the following two essential components:

(i) a first stage amino resin, and
(ii) a polyhydroxyalkyl melamine ingredient.

wherein from about 90 to about 50 parts by weight of the composition is the first stage amino resin; and, from about 10 to about 50 parts by weight of the composition is polyhydroxyalkyl melamine ingredient.

The First Stage Amino Resin

The first stage amino resin is the reaction product of a polyamino compound (or mixture of polyamino compounds) with formaldehyde. The resultant methylolation product may optionally be used as a reactant in an alkylation reaction with a low molecular weight alcohol to give a final product of desired solubility characteristics.

An illustrative reaction sequence with melamine is as follows:

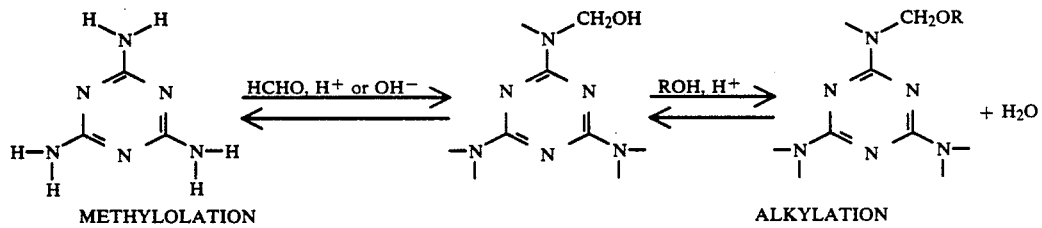

Suitable polyamino compounds for the formation of the first stage amino resin have the general formula

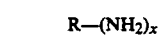

or

wherein R and R' are organic radicals and x is a positive integer of 2 or more. Specific polyamino compounds having utility in this invention are urea, melamine, benzoguanine, glycoluril, or mixtures thereof.

Urea forms a water and alcohol soluble first stage amino resin with the methylolation reaction, the later alkylation reaction being optional. The use of a melamine based first stage amino resin is highly preferred. However, for methylolated melamine, alkylation is necessary to yield a water or alcohol soluble product.

The alkylation is typically performed with a low molecular weight 1 to 4 carbon atom aliphatic alcohol such as methanol, ethanol, n-propanol, isopropanol, butanol, isobutanol or mixtures thereof.

These first stage amino resins are uncured (uncrosslinked) and are usually supplied as viscous liquids dissolved in an aqueous or organic solvent. Typical solvents for the first stage amino resin are water and hydroxyl bearing organic compounds. Water and mixtures of water and water miscible lower molecular weight alcohols are useful as solvents for the first stage amino resin.

The Polyhydroxyalkyl Melamine Ingredient

The second essential ingredient of the composition of the invention is selected from dihydroxyalkyl melamine, trihydroxyalkyl melamine, or a mixture of di- and trihydroxyalkyl melamine compounds (hereinafter referred to as, "polyhydroxyalkyl melamine ingredient"). A mixture of di- and trihydroxyalkyl melamine compounds is particularly preferred in the practice of this invention and is represented by the formulae:

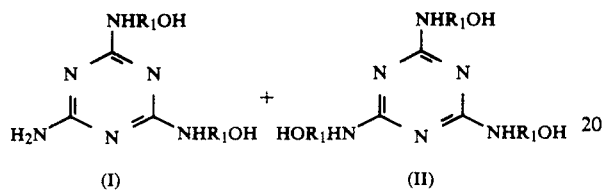

wherein $R_1$ is an alkyl group of from 1 to 8 carbon atoms, and wherein the weight ratio of formula (I) to formula (II) is from about 10:90 to about 90:10 and the preferred weight ratio of formula (I) to formula (II) is from about 20:80 to about 80:20 and a weight ratio of from 35:65 to 65:35 is particularly preferred.

Particularly preferred as the polyhydroxyalkyl melamine ingredients is a mixture of di- and trihydroxypropyl melamine compounds represented by the formulae:

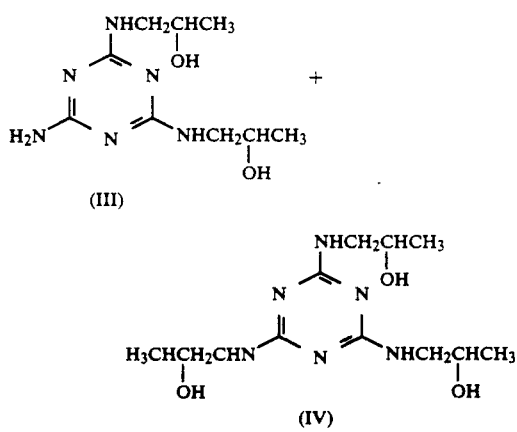

wherein the weight ratio of formula (III) to formula (IV) is from about 10:90 to about 90:10 and the preferred weight ratio of formula (III) to formula (IV) is from 35:65 to 65:35.

This invention is not bound by any theory of operation but it is believed that the polyhydroxyalkyl melamine ingredient is reactive with the first stage amino resin to give upon curing a resin product with a reduced tendency to emit formaldehyde.

The composition of the invention desirably includes a liquid medium to facilitate its application to textiles.

The compositions of the invention may have in addition to the essential (i) first stage amino resin and (ii) polyhydroxyalkyl melamine components a variety of optional ingredients such as colorants, odorants, diluents, surfactants, catalysts for curing, and etc. Generally, it is contemplated that essential components (i) and (ii) will comprise the major part of the resin forming materials of the invention.

If desired, other resins such as acrylic resins may be added to the textile finishing composition of the invention as supplemental resin forming materials However, addition of these non-amino resins must be such that they constitute only a minor part of the total resin component. Non-amino resin addition to the composition of the invention has been found to degrade the "hand" obtained from amino resin fabric treatment.

TEXTILES FINISHED BY THE COMPOSITION OF THE INVENTION

The Composition Application Step

The composition of the invention may be applied to any woven or nonwoven textile by conventional processes such as dipping, spraying, or padding. One or more treatments of the textile with the composition of the invention may be used. Generally, the textile is contacted with the composition of the invention until the add-on resin weight is from about 1.0 to about 10 weight percent of the dry weight of textile, although more or less can be used as desired.

Any textile will benefit by application of the fabric finishing composition of the invention because of improved hand or resiliency of the treated fabric. However, the benefit of reduced formaldehyde emission is most notable for certain classes of fabric, in particular, nylon-containing and cotton-containing fabrics benefit most from application of the composition of the invention.

In an exemplary process for applying the amino resin to a fabric, the composition of the invention is dissolved, emulsified or suspended in a suitable medium. Water, water/alcohol, or alcohol based systems are particularly preferred.

A medium consisting substantially of water is most preferred because of cost and alleviation of solvent recovery problems.

A curing catalyst is added to the composition of the invention prior to treatment of the textile with the amino-resin finishing agent bath. Generally, the pH of the uncured first stage amino resin is slightly acidic, neutral or basic. The addition of curing catalyst typically lowers the pH of the textile treatment bath and limits its useful shelf life to less than 8 hours.

The most active catalysts are those with the lowest pKa values. The following materials are suitable conventional amino-resin catalysts for curing (crosslinking) the composition of the invention:

mineral acids
oxalic, maleic, hexamic acids
sulfuric acids
acidic resins
metal salts, Examples of metal salt catalysts are magnesium halides and zinc or aluminum nitrates.

Generally, the amino resin content of the liquid textile finishing agent of the invention is from about 0.5 percent to about 20 percent by weight of the of the total composition. The range of concentration of resin ingredient in the liquid medium is usually made sufficient to impart the desired weight of resin in one treatment of the fabric with the textile finishing composition.

The Textile Curing Step

The textile treated with the fabric finishing composition of the invention is cured to insolubilize the first stage amino resin by the use of heat and/or catalyst. Thus, an acid catalyst may be added to the fabric treating bath just prior to application. Alternatively, the catalyst may be separately added to the fabric. The curing process forms a crosslinked amino resin that is permanently affixed to the fabric and resists removal by washing and normal wear.

Curing may be accelerated by application of heat to the finishing composition containing textile. Typically, heat is applied for a period of from five seconds to ten minutes at a temperature of at least about 225 degrees F. (107.2° C.) up to about 400 degrees F. (204.4° C.).

The following Example is not in any way to be regarded as limiting the invention or the claims. The Example describes various embodiments of the inventions together with control experiments outside the scope of the invention.

EXAMPLE

Samples S2A, S2B, S3A, and S3B are illustrative of the composition of the invention. Samples S1A and S1B are outside the scope of the invention and use only the first stage amino resin ingredient of the invention. Samples S4A and S4B are outside the scope of the invention and use only the polyhydroxyalkyl melamine ingredient of the invention. Samples S5A and S5B are outside the scope of the invention and use an acrylic resin as a coingredient with the first stage amino resin.

| Ingredient/Sample | FABRIC FINISHING AGENT (Weight % Ingredients) | | | | | | | | | |
|---|---|---|---|---|---|---|---|---|---|---|
| | S1A | S1B | S2A | S2B | S3A | S3B | S4A | S4B | S5A | S5B |
| Amino Resin[1] | 4 | 4 | 3 | 3 | 2 | 2 | — | — | 2 | 2 |
| Melamine Polyol[2] | — | — | 1 | 1 | 2 | 2 | 4 | 4 | — | — |
| Acrylic Resin[3] | — | — | — | — | — | — | — | — | 2 | 2 |
| Magnesium Chloride[4] | .48 | .48 | .48 | .48 | .48 | .48 | .48 | .48 | .48 | .48 |
| Decersol NI[5] | 0.1 | 0.1 | 0.1 | 0.1 | 0.1 | 0.1 | 0.1 | 0.1 | 0.1 | 0.1 |
| Bath pH | 8.0 | 7.7 | 9.5 | 9.4 | 9.6 | 9.6 | 9.6 | 9.6 | 6.0 | 6.4 |

[1]Aerotex M3 resin, a water soluble melamine-formaldehyde condensate, product of American Cyanamid Company, Textile Chemicals Division
[2]MELPOL ™ water soluble melamine polyol mixture of di- and tri-hydroxypropylmelamine derivatives, mol. wt. 265-270, melting point range 46-64° C., product of American Cyanamid Company.
[3]Rhoplex HA 16 hard acrylic resin, 40% solids, product of Rohm and Haas Company.
[4]Aerotex ™ MX accelerator, product of American Cyanamid Company.
[5]Deceresol NI surfactant.

It is a discovery of this invention that the use of polyhydroxylalkyl melamine ingredient in conjunction with a first stage amino resin permits successful substitution of a portion of the amino resin without loss of most of the desirable properties of the amino resin. Not all of the amino resin may be substituted for by the polyhydroxylpropyl melamine ingredient. However, about up to one-half by weight of the first stage amino resin may be removed from the finishing formulation and substituted by the polyhydroxyalkyl melamine ingredient. Preferably, from about one-half or less of the amino resin ingredient is substituted by polyhydroxypropyl melamine ingredient.

The above Finishing Agent formulations were applied to nylon sheer and cotton broadcloth fabric.

The Finishing Agent was prepared as an aqueous solution and applied to the fabric samples under the following conditions:

| | |
|---|---|
| Padder pressure | 1 ton (907.2 kg) |
| Drying | 6 feet at 225° F. (182.9 cm at 107.2° C.) |
| Curing | 2 feet at 340° F. (61.0 cm at 171.1° C.) formed to size |
| Dry and Cure | one pass |

The following test results were obtained:

| Sample | FABRIC FINISHING AGENT TEST RESULTS FOR COTTON | | | | | | | | | |
|---|---|---|---|---|---|---|---|---|---|---|
| | S1A | S1B | S2A | S2B | S3A | S3B | S4A | S4B | S5A | S5B |
| Formaldehyde[6] Release | 5063 | 5063 | 1713 | 1475 | 1150 | 706 | 125 | 63 | 1875 | 2000 |
| Hand for Firmness[7] (Cumulative-Initial) | 5 | 7 | 5 | 8 | 9 | 12 | 13 | 15 | 8 | 3 |
| Hand/Firmness (Cumulative-5 Washes) | 11 | 11 | 9 | 3 | 7 | 11 | 15 | 11 | 3 | 7 |
| Hand for Resilience[8] (Cumulative-Initial) | 3 | — | 10 | — | 14 | — | 16 | — | 11 | — |
| Hand for Resiliency (Cumulative-5 Washes) | 3 | — | 9 | — | 11 | — | 10 | — | 7 | — |
| Whiteness[9] | 75.7 | 75.9 | 77.1 | 74.8 | 77.6 | 74.9 | 76.6 | 73.3 | 77.1 | 75.0 |

[6]Method, American Association of Textile Chemists and Colorists Test No. 112.
[7]Method, Rating of four observers (cumulative).
[8]Method, Rating of three observers (cumulative).
[9]Method, American Society for Testing Materials, Test E306; Standard Method for Absolute Calibration of Reflective Standards.

| Sample | FABRIC FINISHING AGENT TEST RESULTS FOR NYLON | | | | | | | | | |
|---|---|---|---|---|---|---|---|---|---|---|
| | S1A | S1B | S2A | S2B | S3A | S3B | S4A | S4B | S5A | S5B |
| Formaldehyde | 888 | 1231 | 688 | 863 | 444 | 425 | 56 | 44 | 763 | 675 |

| FABRIC FINISHING AGENT TEST RESULTS FOR NYLON -continued | | | | | | | | | | |
|---|---|---|---|---|---|---|---|---|---|---|
| Sample | S1A | S1B | S2A | S2B | S3A | S3B | S4A | S4B | S5A | S5B |
| Release Hand/Firmness (Cumulative-Initial) | 7 | 4 | 8 | 5 | 11 | 9 | 13 | 12 | 3 | 9 |
| Hand/Firmness (Cumulative-5 Washes) | 5 | 3 | 4 | 6 | 11 | 12 | 14 | 14 | 9 | 10 |
| Whiteness | 74.2 | 70.1 | 75.7 | 73.2 | 76.5 | 74.2 | 72.2 | 60.0 | 73.6 | 71.7 |

Results and Conclusions

1. The firmness and resiliency of the treated fabrics were in direct relation to the amino resin content of the treated fabric.
2. The formaldehyde release level was in direct relationship to the amino resin content of the treated fabric.
3. The di- and trihydroxypropyl melamine ingredient (MELPOL TM brand of melamine polyol) was able to satisfactorily replace an equal or lesser part of the weight of amino resin ingredient in textile finishing formulation without excessive loss of firmness or resiliency.
4. The textile finishing bath containing amino resin and acrylic resin (absent di- and trihydroxypropyl melamine) gave acceptable fabric firmness but lacked resilience and had a more "dead" hand than the 3:1 amino resin/Melpol formulation, but was slightly more resilient than the 1:1 amino resin/Melpol formulation.

What is claimed is:

1. An amino resin composition comprising as resin forming components:
   (i) from about 90 to about 50 parts by weight of a first stage amino resin; and,
   (ii) from about 10 to about 50 parts by weight of a polyhydroxylalkyl melamine reactant represented by the formulae:

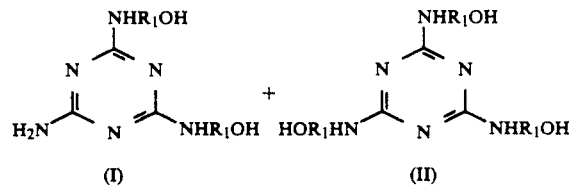

wherein the weight ratio of formula (I) to formula (II) is from about 10:90 to about 90:10, and $R_1$ is an alkyl group of from 2 to 8 carbon atoms.

2. The composition of claim 1 wherein the weight ratio of formula (I) to formula (II) is from about 20:80 to 80:20.

3. A cured amino resin produced by the process of contacting the composition of claim 1 with a curing catalyst.

4. The cured resin of claim 3 produced by using a Lewis acid catalyst.

5. An amino resin coating composition comprising:
   (A) a resin forming ingredient having as essential components;
      (i) from about 90 to about 50 parts by weight of a first stage amino resin; and,
      (ii) from about 10 to about 50 parts by weight of a polyhydroxypropyl melamine reactant represented by the formulae:

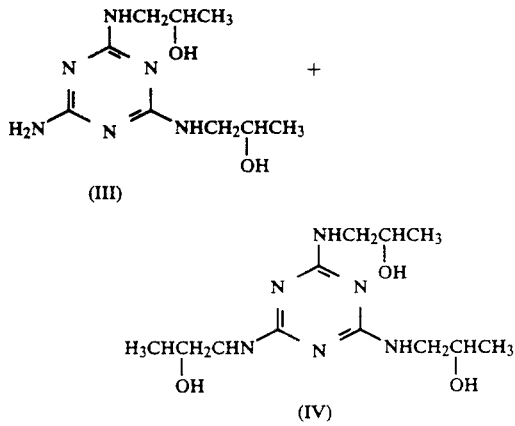

wherein the weight ratio of formula (III) to formula (IV) is from about 10:90 to about 90:10;
   (B) a liquid medium.

6. An amino resin coating composition comprising:
   (A) a resin forming ingredient having as essential components;
      (i) from about 90 to about 50 parts by weight of a first stage amino resin; and,
      (ii) from about 10 to about 50 parts by weight of a polyhydroxypropyl melamine ingredient represented by the formulae:

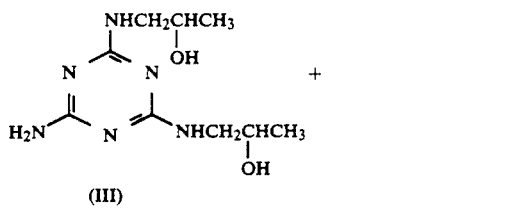

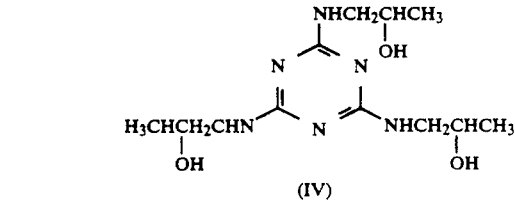

wherein the weight ratio of formula (III) to formula (IV) is from about 10:90 to about 90:10;
   (B) a liquid medium;
   (C) an amino resin curing catalyst.

7. The composition of claim 6 having as ingredient (C) a Lewis acid curing catalyst.

8. The composition of claim 7 having as ingredient (C) magnesium chloride.

9. An amino resin textile finishing composition for nylon-containing and cotton-containing textiles, said composition having a reduced tendency to emit formaldehyde and comprising:
(A) a resin forming ingredient having as essential components;
  (i) from about 90 to about 50 parts by weight of a first stage amino resin; and,
  (ii) from about 10 to about 50 parts by weight of a polyhydroxyalkyl melamine reactant represented by the formulae:

(I) and (II) structures with $NHR_1OH$ and $H_2N$, $HOR_1HN$ substituents on triazine rings wherein $R_1$ is an alkyl group of from 2 to 8 carbon atoms, and wherein the weight ratio of formula (I) to formula (II) is from 35:65 to 65:35, and;
(B) a liquid medium.

10. The composition of claim 9 wherein the first stage amino resin is formed by the methylolation of melamine with formaldehyde followed by alkylation with an alcohol of one to four carbon atoms.

11. The composition of claim 9 wherein the liquid medium is an aqueous medium.

12. The composition of claim 9 wherein the liquid medium is a solvent for the resin forming ingredients.

13. The composition of claim 9 wherein the resin forming ingredient consists essentially of;
  (i) from about 90 to 50 parts by weight of a first stage amino resin; and,
  (ii) from about 10 to 50 parts by weight of a polyhydroxypropyl melamine reactant represented by the formulae:

(III) structure with $NHCH_2CHCH_3$ / $OH$ substituents (IV) structure with $NHCH_2CHCH_3$ / $OH$ and $H_3CHCH_2CHN$ / $OH$ substituents wherein the weight ratio of formula (III) to formula (IV) is from 35:65 to 65:35.

14. The composition of claim 9 containing a surfactant.

15. The composition of claim 9 containing an amino resin curing catalyst.

16. The composition of claim 15 containing a Lewis acid catalyst.

17. The composition of claim 16 wherein the Lewis acid catalyst is selected from zinc nitrate and magnesium chloride.

18. An amino resin composition comprising as resin forming components:
  (i) from about 90 to about 50 parts by weight of a first stage amino resin; and,
  (ii) from about 10 to about 50 parts by weight of a dihydroxyalkyl melamine wherein the alkyl groups have from 2-8 carbon atoms.

19. The composition of claim 18 wherein the dihydroxyalkylmelamine is dihydroxypropyl melamine.

20. The composition of claim 18 wherein the trihydroxyalkylmelamine is trihydroxypropyl melamine.

21. An amino resin composition comprising as resin forming components:
  (i) from about 90 to about 50 parts by weight of a first stage amino resin; and,
  (ii) from about 10 to about 50 parts by weight of a trihydroxyalkyl melamine wherein the alkyl groups have from 2-8 carbon atoms.

22. An amino resin treated textile, produced by a process wherein the improvement comprises contacting said textile with an amino resin coating composition comprising:
(A) a resin forming ingredient having as essential components;
  (i) from about 90 to about 50 parts by weight of a first stage amino resin; and,
  (ii) from about 10 to about 50 parts by weight of a polyhydroxyalkyl melamine ingredient represented by the formulae:

(I) and (II) structures with $NHR_1OH$ and $H_2N$, $HOR_1HN$ substituents on triazine rings wherein the weight ratio of formula (I) to formula (II) is from about 10:90 to about 90:10, $R_1$ is an alkyl group of from 2 to 8 carbon atoms;
(B) a liquid medium;
(C) an amino resin curing catalyst.

23. The textile of claim 22 wherein the resin forming ingredient consists essentially of;
  (i) from about 90 to 50 parts by weight of a first stage amino resin; and,
  (ii) from about 10 to 50 parts by weight of a polyhydroxypropyl melamine reactant represented by the formulae:

(III) structure with $NHCH_2CHCH_3$ / $OH$ substituents

-continued $$\text{(IV)}\quad \underset{\underset{OH}{|}}{H_3CHCH_2CHN}-\text{[triazine ring with }NHCH_2CHCH_3/OH\text{ substituents]}-\underset{\underset{OH}{|}}{NHCH_2CHCH_3}$$

wherein the weight ratio of formula (III) to formula (IV) is from 35:65 to 65:35.

24. The textile of claim 22 having as ingredient (C) an acid curing catalyst.

25. The textile of claim 22 having as ingredient (C) a Lewis acid catalyst.

26. The textile of claim 25 wherein the Lewis acid catalyst is selected from zinc nitrate and magnesium chloride.

27. The textile of claim 22 containing a surfactant.

28. The textile of claim 22 wherein said textile is nylon containing.

29. The textile of claim 22 wherein said textile is cotton containing.

30. An amino resin treated textile, produced by a process wherein the improvement comprises contacting said textile with an amino resin coating composition comprising:

(A) a resin forming ingredient having as essential components;
  (i) from about 90 to about 50 parts by weight of a first stage amino resin; and,
  (ii) from about 10 to about 50 parts by weight of a dihydroxyalkyl melamine ingredient wherein the alkyl groups have from 2-8 carbon atoms,
(B) a liquid medium;
(C) an amino resin curing catalyst.

31. An amino resin treated textile, produced by a process wherein the improvement comprises contacting said textile with an amino resin coating composition comprising:

(A) a resin forming ingredient having as essential components;
  (i) from about 90 to about 50 parts by weight of a first stage amino resin; and,
  (ii) from about 10 to about 50 parts by weight of a trihydroxyalkyl melamine ingredient wherein the alkyl groups have from 2-8 carbon atoms,
(B) a liquid medium;
(C) an amino resin curing catalyst.

32. A process for producing an amino resin treated textile wherein the improvement comprises:

(1) contacting a textile with an amino resin forming bath having as components;
  (i) from about 90 to about 50 parts by weight of a first stage amino resin;
  (ii) from about 10 to about 50 parts by weight of a polyhydroxylalkyl melamine reactant represented by the formulae:

(I) [triazine structure with $NHR_1OH$, $H_2N$, $NHR_1OH$ substituents]

(II) [triazine structure with $NHR_1OH$, $HOR_1HN$, $NHR_1OH$ substituents]

wherein the weight ratio for formula (I) to formula (II) is from about 30:70 to about 70:30 and $R_1$ is an alkyl group of from 2 to 8 carbon atoms;
  (iii) a curing catalyst;
  (iv) a liquid medium;

(2) and thereafter curing the resin forming ingredients to affix said resin to said textile.

33. The process of claim 32 wherein the resin forming ingredient consists essentially of;
  (i) from about 90 to 50 parts by weight of a first stage amino resin; and,
  (ii) from about 10 to 50 parts by weight of a polyhydroxypropyl melamine reactant represented by the formulae:

(III) [triazine structure with $NHCH_2CHCH_3/OH$, $H_2N$, $NHCH_2CHCH_3/OH$ substituents]

(IV) [triazine structure with $NHCH_2CHCH_3/OH$, $H_3CHCH_2CHN/OH$, $NHCH_2CHCH_3/OH$ substituents]

wherein the weight ratio of formula (III) to formula (IV) is from 35:65 to 65:35.

34. The process of claim 32 wherein the first stage amino resin is formed by the methylolation of melamine with formaldehyde followed by alkylation with an alcohol of one to four carbon atoms.

35. The process of claim 32 wherein the liquid medium is an aqueous medium.

36. The process of claim 32 wherein the liquid medium is a solvent for the resin forming ingredients.

37. The process of claim 32 wherein the curing for the resin forming ingredient is done with the aid of heat.

38. The process of claim 37 wherein the textile is heated for a time from about five seconds to about ten minutes at a temperature of from about 225° F. to about 400° F.

39. The process of claim 32 wherein (iii) consists of a Lewis acid catalyst.

40. The process of claim 39 wherein the Lewis acid catalyst is selected from zinc nitrate and magnesium chloride.

41. The process of claim 26 wherein the amino resin forming bath contains a surfactant.

42. The process of claim 32 wherein the textile finished by said process is nylon containing.

43. The process of claim 32 wherein the textile finished by said process is cotton containing.

* * * * *

UNITED STATES PATENT AND TRADEMARK OFFICE
CERTIFICATE OF CORRECTION

PATENT NO. : 5,066,307
DATED : November 19, 1991
INVENTOR(S) : Robert G. Lees & Edward B. Lawler It is certified that error appears in the above—identified patent and that said Letters Patent is hereby corrected as shown below:

Claim 41 is corrected at column 12, line 62, as follows: The number "26" in the first line of the claim is deleted and substituted therefore is the number --32--.

Signed and Sealed this

Sixteenth Day of March, 1993

Attest:

STEPHEN G. KUNIN

*Attesting Officer* — *Acting Commissioner of Patents and Trademarks*